(12) United States Patent
Iwashita et al.

(10) Patent No.: US 8,736,217 B2
(45) Date of Patent: May 27, 2014

(54) SERVO MOTOR CONTROL DEVICE FOR CONTROLLING SERVO MOTOR CONFIGURED TO DRIVE FEED AXIS OF MACHINE TOOL

(71) Applicant: FANUC Corporation, Yamanashi (JP)

(72) Inventors: Yasusuke Iwashita, Yamanashi (JP); Satoshi Ikai, Yamanashi (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/803,453

(22) Filed: Mar. 14, 2013

(65) Prior Publication Data

US 2013/0264988 A1 Oct. 10, 2013

(30) Foreign Application Priority Data

Apr. 10, 2012 (JP) ................................. 2012-089228

(51) Int. Cl.
*B25J 9/16* (2006.01)

(52) U.S. Cl.
USPC ...................................................... 318/568.1

(58) Field of Classification Search
USPC .............................................. 318/567, 568.1
See application file for complete search history.

(56) References Cited

U.S. PATENT DOCUMENTS

| 4,779,204 | A | 10/1988 | Kanematsu et al. | |
| 5,194,790 | A * | 3/1993 | Niimi | 318/567 |
| 7,808,199 | B2 * | 10/2010 | Okita et al. | 318/619 |
| 8,082,048 | B2 * | 12/2011 | Eguchi | 700/70 |
| 2009/0009128 | A1 * | 1/2009 | Okita et al. | 318/619 |

FOREIGN PATENT DOCUMENTS

| CN | 1781659 A | 6/2006 |
| CN | 101311854 A | 11/2006 |
| DE | 38 51 387 T2 | 5/1995 |
| DE | 199 00 140 A1 | 7/1999 |
| JP | 2000-039061 A | 2/2000 |
| JP | 2000-214912 A | 8/2000 |
| JP | 2000-277994 A | 10/2000 |
| JP | 2001-079731 A | 3/2001 |
| JP | 2001-290501 A | 10/2001 |
| JP | 2003-216243 A | 7/2003 |
| JP | 2008-130013 A | 6/2008 |
| JP | 2009-303423 A | 12/2009 |
| JP | 4441493 B2 | 3/2010 |

* cited by examiner

*Primary Examiner* — Shawki S Ismail
*Assistant Examiner* — Zoheb Imtiaz
(74) *Attorney, Agent, or Firm* — Drinker Biddle & Reath LLP (57) ABSTRACT

An arithmetic coefficient setting unit sets a feedback control arithmetic coefficient to a value between a first feedback control arithmetic coefficient value for a cutting-feed and a second feedback control arithmetic coefficient value for a rapid-traverse operation smaller than the first feedback control arithmetic coefficient value. An arithmetic coefficient change unit continuously changes the feedback control arithmetic coefficient from the second feedback control arithmetic coefficient value to the first feedback control arithmetic coefficient value over a first period between a first time, which is an arbitrary time during the rapid-traverse operation, and the second time after the first time or a second period between a third time after the first time and before the second time, and the second time if it is predicted at the first time that the operating command switches from the rapid-traverse operation command to the cutting-feed command at the second time.

8 Claims, 8 Drawing Sheets

SERVO MOTOR CONTROL DEVICE FOR CONTROLLING SERVO MOTOR CONFIGURED TO DRIVE FEED AXIS OF MACHINE TOOL

RELATED APPLICATION DATA

This application claims priority under 35 U.S.C. §119 and/or §365 to Japanese Application No. 2012-089228 filed Apr. 10, 2012, the entire contents of which is incorporated herein by reference.

BACKGROUND OF THE INVENTION

1. Field of the Invention

The present invention relates to a servo motor control device for carrying out feedback control for a servo motor configured to drive a feed axis of a machine tool.

2. Description of Related Art

Operations of the feed axis of a machine tool driven by a servo motor include cutting-feed to move the feed axis of the machine tool while cutting a workpiece if the operating command in a machining program to machine the workpiece using the machine tool is a cutting-feed command, and a rapid-traverse operation to move the feed axis of the machine tool without cutting a workpiece if the operating command in a machining program to machine the workpiece using the machine tool is a rapid-traverse operation command. While priority is given to accurate cutting rather than quick movement to a destination in the cutting-feed, a quick movement to the destination is required in the rapid-traverse operation, and therefore, the feed speed and acceleration of the feed axis during the cutting-feed are set lower than the feed speed and acceleration of the feed axis during the rapid-traverse operation.

In a servo motor control device for carrying out feedback control for a servo motor configured to drive a feed axis of the machine tool, in order to control vibration of the servo motor, a servo motor control device, which uses an arithmetic coefficient value for the rapid-traverse operation and an arithmetic coefficient value for the cutting-feed higher than the arithmetic coefficient value for the rapid-traverse operation, as arithmetic coefficients, such as position control gain, proportional gain, integral gain, etc., for creating a velocity command and a torque command to the servo motor, is proposed in, for example, Japanese Unexamined Patent Publication (Kokai) No. 2000-277994 (JP2000-277994A) and Japanese Unexamined Patent Publication (Kokai) No. 2003-216243 (JP2003-216243A). In this case, when the operation of the feed axis is switched from the rapid-traverse operation to the cutting-feed or from the cutting-feed to the rapid-traverse operation, the servo motor control device temporarily stops the servo motor and discontinuously changes the arithmetic coefficient from the arithmetic coefficient value for the rapid-traverse operation to the arithmetic coefficient value for the cutting-feed, or from the arithmetic coefficient value for the cutting-feed to the arithmetic coefficient value for the rapid-traverse operation.

In a servo motor control device, which discontinuously changes the arithmetic coefficient as described above, if the arithmetic coefficient is changed discontinuously without stopping the servo motor in order to reduce the machining time of the workpiece, the torque command becomes discontinuous caused by discontinuous velocity command, and therefore, there is a disadvantage that the shock of the servo motor increases.

On the other hand, as a control device for carrying out feedback control, a control device, which continuously changes arithmetic coefficients between two modes, is proposed in, for example, Japanese Unexamined Patent Publication (Kokai) No. 2000-39061 (JP2000-39061A), Japanese Unexamined Patent Publication (Kokai) No. 2001-290501 (JP2001-290501A), Japanese Unexamined Patent Publication (Kokai) No. 2009-303423 (JP2009-303423A), and Japanese Patent No. 4441493 (JP4441493B). In the case where such a control device is applied to the servo motor control device and the operation of the feed axis is switched from the rapid-traverse operation to the cutting-feed or from the cutting-feed to the rapid-traverse operation, the arithmetic coefficients change continuously even if the servo motor is not stopped. Due to this, the velocity command changes continuously, and therefore, the torque command does not become discontinuous and it is possible to avoid an increase in the shock of the servo motor.

In the case where the operation of the feed axis is switched from the rapid-traverse operation to the cutting-feed in the control device, which changes arithmetic coefficients continuously between two modes, the change of the arithmetic coefficient is started at the time of switching from the rapid-traverse operation to the cutting-feed and when a predetermined time elapses from the start of the cutting-feed, the arithmetic coefficient reaches the arithmetic coefficient value for the cutting-feed. Due to this, during the period from the start of the cutting-feed to the time when the arithmetic coefficient reaches the arithmetic coefficient value for the cutting-feed, the arithmetic coefficient is lower than the arithmetic coefficient value for the cutting-feed, and therefore, the value of the torque command is low and there may be a case where the torque of the servo motor is not sufficient. Consequently, there may be a case where the machining accuracy of the machine tool deteriorates immediately after the feed axis of the machine tool is switched from the rapid-traverse operation to the cutting-feed.

SUMMARY OF THE INVENTION

As an aspect, the present invention provides a servo motor control device in which the machining time of a workpiece to be machined by a machine tool is shortened and the machining accuracy of the machine tool does not deteriorate immediately after the operation of the feed axis of the machine tool switches from the rapid-traverse operation to the cutting-feed.

According to an aspect of the present invention, a servo motor control device for carrying out feedback control to a servo motor configured to drive a feed axis of a machine tool in order to carry out: a cutting-feed to move the feed axis of the machine tool while cutting a workpiece if an operating command in a machining program to machine the workpiece using the machine tool is a cutting-feed command; and a rapid-traverse operation to move the feed axis of the machine tool without cutting a workpiece if the operating command in the machining program to machine the workpiece using the machine tool is a rapid-traverse operation command, includes: an arithmetic coefficient setting unit configured to set a feedback control arithmetic coefficient to a value between a first feedback control arithmetic coefficient value for the cutting-feed and a second feedback control arithmetic coefficient value for the rapid-traverse operation smaller than the first feedback control arithmetic coefficient value; an arithmetic coefficient change unit configured to continuously change the feedback control arithmetic coefficient from the second feedback control arithmetic coefficient value to the first feedback control arithmetic coefficient value over a first period between a first time, which is an arbitrary time during the rapid-traverse operation, and a second time after the first time or a second period between a third time after the first time and before the second time, and the second time if it is predicted at the first time that the operating command will switch from the rapid-traverse operation command to the cutting-feed command at the second time; and a torque command generation unit configured to generate a torque command to the servo motor based on at least one of a position command to the servo motor and a velocity command to the servo motor, at least one of a position error of the servo motor and a velocity error of the servo motor, and the feedback control arithmetic coefficient.

Preferably, the arithmetic coefficient change unit predicts whether or not the operating command will switch from the rapid-traverse operation command to the cutting-feed command at the second time, based on operating command information, which relates to the operating command at the second time, supplied from an external control device, which has read in advance the operating command at the second time from the machining program.

Preferably, the servo motor control device further has an operating command information creation unit configured to create operating command information, which relates to the operating command at the second time by reading in advance the operating command at the second time from the machining program and provide the operating command information to the arithmetic coefficient change unit, wherein the arithmetic coefficient change unit predicts whether or not the operating command will switch from the rapid-traverse operation to the cutting-feed at the second time, based on the operating command information.

Preferably, the arithmetic coefficient change unit further has an operating command information creation unit configured to create operating command information, which relates to the operating command at the second time by reading in advance the operating command at the second time from the machining program, and predicts whether or not the operating command will switch from the rapid-traverse operation to the cutting-feed at the second time, based on the operating command information.

Preferably, the arithmetic coefficient change unit linearly changes the feedback control arithmetic coefficient from the second feedback control arithmetic coefficient value to the first feedback control arithmetic coefficient value.

Preferably, if it is predicted that the operating command will switch from the cutting-feed command to the rapid-traverse operation command, the arithmetic coefficient change unit continuously changes the feedback control arithmetic coefficient from the first feedback control arithmetic coefficient value to the second feedback control arithmetic coefficient value over third period between a fourth time when the operating command switches from the cutting-feed command to the rapid-traverse operation command and a fifth time, which is an arbitrary time during the rapid-traverse operation in accordance with the rapid-traverse operation command after the fourth time.

Preferably, the arithmetic coefficient change unit linearly changes the feedback control arithmetic coefficient from the first feedback control arithmetic coefficient value to the second feedback control arithmetic coefficient value.

Another servo motor control device according to the present invention for carrying out feedforward control and feedback control for a servo motor configured to drive a feed axis of a machine tool in order to carry out: a cutting-feed to move the feed axis of the machine tool while cutting a workpiece if an operating command in a machining program to machine the workpiece using the machine tool is a cutting-feed command; and a rapid-traverse operation to move the feed axis of the machine tool without cutting a workpiece if the operating command of the machining program in a machining program to machine the workpiece using the machine tool is a rapid-traverse operation command, includes: an arithmetic coefficient setting unit configured to set a feedforward control arithmetic coefficient to a value between a first feedforward control arithmetic coefficient value for the cutting-feed and a second feedforward control arithmetic coefficient value for the rapid-traverse operation smaller than the first feedforward control arithmetic coefficient value; an arithmetic coefficient change unit configured to continuously change the feedforward control arithmetic coefficient from the second feedforward control arithmetic coefficient value to the first feedforward control arithmetic coefficient value over a first period between a first time, which is an arbitrary time during the rapid-traverse operation, and a second time after the first time or a second period between a third time after the first time and before the second time, and the second time if it is predicted at the first time that the operating command will switch from the rapid-traverse operation command to the cutting-feed command at the second time; and a torque generation unit configured to generate a torque command to the servo motor based on at least one of a position command to the servo motor and a velocity command to the servo motor and the feedforward control arithmetic coefficient.

According to an aspect of the present invention, the machining time of a workpiece to be machined by a machine tool is shortened and the machining accuracy of the machine tool does not deteriorate immediately after the operation of the feed axis of the machine tool switches from the rapid-traverse operation to the cutting-feed.

BRIEF DESCRIPTION OF THE DRAWINGS

The objects, features, and advantages of the present invention will be clear in the following embodiments, and the accompanying drawings. In the drawings.

DETAILED DESCRIPTION

Embodiments of the servo motor drive control device according to the present invention are explained with reference to the drawings. In the drawings, the same symbol is attached to the same component.

Figure 1:
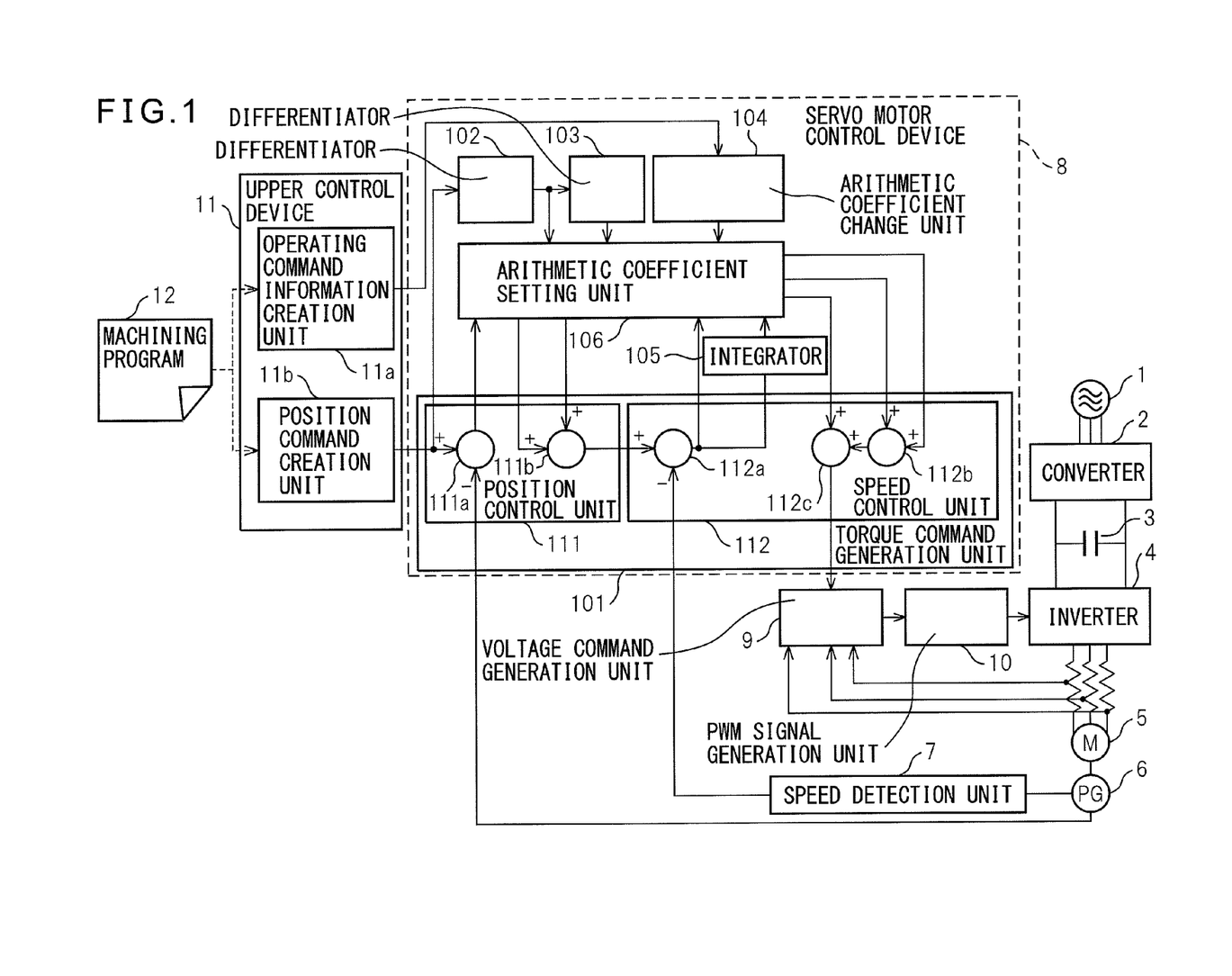
FIG. 1 is a block diagram of a system having a servo motor drive control device according to a first embodiment of the present invention.

Referring to the drawings, FIG. 1 is a block diagram of a system having a servo motor drive control device according to a first embodiment of the present invention. The system shown in FIG. 1 has a three-phase alternating-current power source 1, a converter 2, a smoothing capacitor 3, an inverter 4, a servo motor 5, a position detection unit 6, a speed detection unit 7, a servo motor control device 8, a voltage command generation unit 9, a PWM signal generation unit 10, and an upper control device 11 as an external control device.

The three-phase alternating-current power source 1 is configured by a commercial alternating-current power source. The converter 2 is configured by, for example, a plurality of rectifier diodes (in the case of the three-phase alternating-current power source, six rectifier diodes) and transistors connected in inversely parallel to the rectifier diodes, respectively, and converts alternating-current power supplied from the three-phase alternating-current power source 1 into direct-current power. The smoothing capacitor 3 is connected in parallel to the converter 2 to smooth a voltage rectified by the rectifier diode of the converter 2. The inverter 4 is connected in parallel to the smoothing capacitor 3 and is configured by, for example, a plurality of rectifier diodes (in the case of the three-phase alternating current power source, six rectifier diodes) and transistors connected in inversely parallel to the rectifier diodes, respectively, and converts direct-current power converted by the converter 2 into alternating-current power by carrying out the turning on and off operation of the transistor based on a PWM signal, to be explained later.

The servo motor 5 drives the feed axis of a machine tool in order to carry out a cutting-feed to move the feed axis of the machine tool while cutting a workpiece if the operating command in a machining program (for example, an NC program) 12 to machine the workpiece using the machine tool is a cutting-feed command, and a rapid-traverse operation to move the feed axis of the machine tool without cutting a workpiece if the operating command in the machining program 12 to machine the workpiece using the machine tool is a rapid-traverse operation command. As the servo motor 5, a rotary servo motor in which a permanent magnet is provided in any one of a rotor and a stator, a linear servo motor in which a permanent magnet is provided in any one of a stator and a slider, a vibration servo motor in which a permanent magnet is provided in any one of a stator and a vibrator, etc., is used. In FIG. 1, one servo motor 5 is shown, however, it may also be possible to provide two or more servo motors 5 and to drive at least two feed axes perpendicular to each other to move the table or tool of the machine tool.

The position detection unit 6 is configured by an encoder, a hole element, a resolver, etc., and detects the position of the servo motor 5, i.e., the feed axis, and outputs the position information of the feed axis to the speed detection unit 7 and the servo motor control device 8. The position information of the feed axis is input to the speed detection unit 7, and the speed detection unit 7 detects the feed speed of the feed axis by differentiating the position of the feed axis with respect to time and outputs the speed information of the feed axis to the servo motor control device 8.

The servo motor control device 8 carries out both feedforward control and feedback control to the servo motor. To do this, the servo motor control device 8 has a torque command generation unit 101, differentiators 102 and 103, an arithmetic coefficient change unit 104, an integrator 105, and an arithmetic coefficient setting unit 106.

The torque command generation unit 101 generates a torque command, to be explained later, for the servo motor 5 based on both a position command of the feed axis and a velocity command of the feed axis, both a position error of the servo motor and a velocity error of the servo motor, and both a feedforward control arithmetic coefficient and a feedback control arithmetic coefficient to be explained later. To do this, the torque command generation unit 101 has a position control unit 111 and a speed control unit 112.

The position control unit 111 controls the position of the feed axis using the position command and the position information of the feed axis. To do this, the position control unit 111 has a subtracter 111a and an adder 111b. The subtracter 111a has a positive input terminal, to which the position command of the feed axis is input from the upper control device 11, a negative input terminal, to which the position information of the feed axis is input from the position detection unit 6, and an output terminal, which outputs the position error between the position command value of the feed axis and the value of the position of the feed axis to the arithmetic coefficient setting unit 106. The adder 111b has first and second positive input terminals, to which signals from the arithmetic coefficient setting unit 106 are input, and an output terminal, which generates a velocity command of the feed axis, based on the input signals and outputs the velocity command to the speed control unit 112.

The speed control unit 112 controls the speed of the feed axis using the velocity command and the speed information of the feed axis. To do this, the speed control unit 112 has a subtracter 112a, and adders 112b and 112c. The subtracter 112a has a positive input terminal, to which a velocity command of the feed axis is input from the output terminal of the adder 111b, a negative input terminal, to which speed information of the feed axis is input from the speed detection unit 7, and an output terminal that outputs the velocity error between the velocity command value of the feed axis and the value of the speed of the feed axis to the arithmetic coefficient setting unit 106. The adder 112b has first and second positive input terminals, to which signals from the arithmetic coefficient setting unit 106 are input, and an output terminal, which outputs the sum of these signals to the adder 112c. The adder 112c has a first positive input terminal, to which a signal from the output terminal of the adder 112b is input, a second positive input terminal, to which a signal from the arithmetic coefficient setting unit 106 is input, and an output terminal, which generates a torque command based on the input signals, which are input to the adder 112c, and outputs the torque command to the voltage command generation unit 9.

The position command of the feed axis is input from the upper control device 11 to the differentiator 102, and the differentiator 102 obtains the first derivative of the value of the position command of the feed axis with respect to time and inputs the first derivative of the value of the position command of the feed axis (first derivative of position command value) to the differentiator 103 and the arithmetic coefficient setting unit 106. The first derivative of position command value is input from the differentiator 102 to the differentiator 103, and the differentiator 103 inputs a second derivative of the value of the position command of the feed axis (second derivative of position command value) to the arithmetic coefficient setting unit 106.

As will be explained later, the arithmetic coefficient change unit 104 continuously changes the feedforward control arithmetic coefficient between a first feedforward control arithmetic coefficient value for the cutting-feed and a second feedforward control arithmetic coefficient value for the rapid-traverse operation smaller than the first feedforward control arithmetic coefficient value, and continuously changes the feedback control arithmetic coefficient between a first feedback control arithmetic coefficient value for the cutting-feed and a second feedback control arithmetic coefficient value for the rapid-traverse operation smaller than the first feedback control arithmetic coefficient value. The integrator 105 obtains the first integral of the value of the velocity error (first integral of velocity error) supplied from the adder 112a and outputs the first integral of the velocity error to the arithmetic coefficient setting unit 106.

Figure 2:
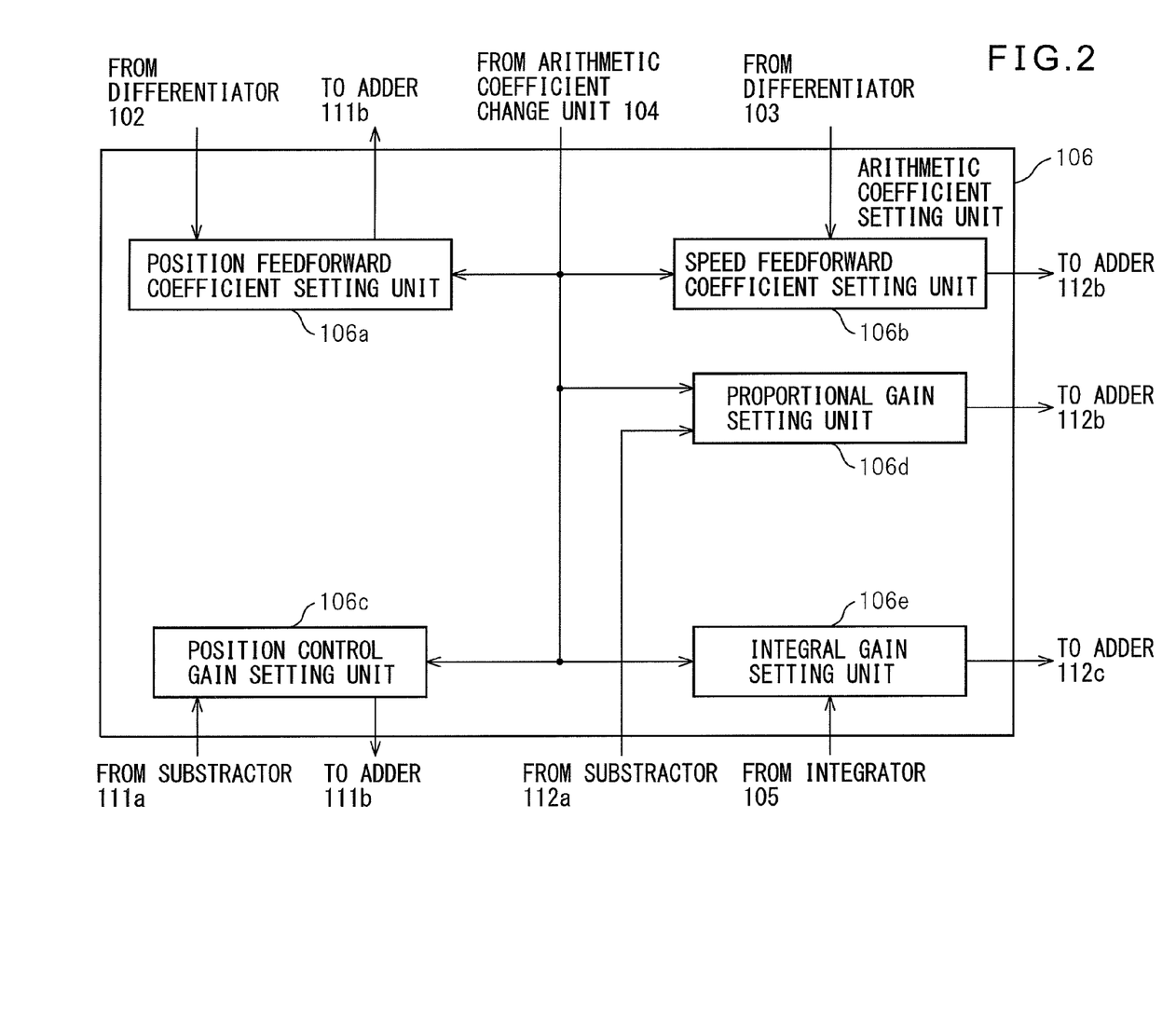
FIG. 2 is a block diagram showing an arithmetic coefficient setting unit in FIG. 1 in detail.

The arithmetic coefficient setting unit 106 sets the feedforward control arithmetic coefficient to a value between the first feedforward control arithmetic coefficient value for the cutting-feed and the second feedforward control arithmetic coefficient value for the rapid-traverse operation smaller than the first feedforward control arithmetic coefficient value, and sets the feedback control arithmetic coefficient to a value between the first feedback control arithmetic coefficient value for the cutting-feed and the second feedback control arithmetic coefficient value for the rapid-traverse operation smaller than the first feedback control arithmetic coefficient value. To do this, as shown in FIG. 2, the arithmetic coefficient setting unit 106 has a position feedforward coefficient setting unit 106a, a speed feedforward coefficient setting unit 106b, a position control gain setting unit 106c, a proportional gain setting unit 106d, and an integral gain setting unit 106e.

The position feedforward coefficient setting unit 106a sets a position feedforward coefficient as a feedforward control arithmetic coefficient to a value between a first position feedforward coefficient value for the cutting-feed and a second position feedforward coefficient value for the rapid-traverse operation smaller than the first position feedforward coefficient value. In order to set the position feedforward coefficient, the arithmetic coefficient change unit 104 continuously changes the position feedforward coefficient between the first position feedforward coefficient value and the second position feedforward coefficient value. Further, the first derivative of position command value is input from the differentiator 102 to the position feedforward coefficient setting unit 106a, and the position feedforward coefficient setting unit 106a inputs the product of the position feedforward coefficient, which is set as described above, and the first derivative of position command value to the first positive input terminal of the adder 111b.

The speed feedforward coefficient setting unit 106b sets a speed feedforward coefficient as a feedforward control arithmetic coefficient to a value between a first speed feedforward coefficient value for the cutting-feed and a second speed feedforward coefficient value for the rapid-traverse operation smaller than the first speed feedforward coefficient value. In order to set the speed feedforward coefficient, the arithmetic coefficient change unit 104 continuously changes the speed feedforward coefficient between the first speed feedforward coefficient value and the second speed feedforward coefficient value. Further, the second derivative of position command value is input from the differentiator 103 to the speed feedforward coefficient setting unit 106b, and the speed feedforward coefficient setting unit 106b inputs the product of the speed feedforward coefficient, which is set as described above, and the second derivative of position command value to the first positive input terminal of the adder 112b.

The position control gain setting unit 106c sets a position control gain as a feedback control arithmetic coefficient to a value between a first position control gain value for the cutting-feed and a second position control gain value for the rapid-traverse operation smaller than the first position control gain value. In order to set the position control gain, the arithmetic coefficient change unit 104 continuously changes the position control gain between the first position control gain value and the second position control gain value. Further, the position error is input from the subtracter 111a to the position control gain setting unit 106c, and the position control gain setting unit 106c inputs the product of the position control gain, which is set as described above, and the position error to the second positive input terminal of the adder 111b.

The proportional gain setting unit 106d sets a proportional gain as a feedback control arithmetic coefficient to a value between a first proportional gain value to be set for the cutting-feed and a second proportional gain value for the rapid-traverse operation smaller than the first proportional gain value. In order to set the proportional gain, the arithmetic coefficient change unit 104 continuously changes the proportional gain between the first proportional gain value and the second proportional gain value. Further, the velocity error is input from the subtracter 112a to the proportional gain setting unit 106d, and the proportional gain setting unit 106d inputs the product of the proportional gain, which is set as described above, and the velocity error to the second positive input terminal of the adder 112b.

The integral gain setting unit 106e sets an integral gain as a feedback control arithmetic coefficient to a value between a first integral gain value for the cutting-feed and a second integral gain value for the rapid-traverse operation smaller than the first integral gain value. In order to set the integral gain, the arithmetic coefficient change unit 104 continuously changes the integral gain between the first integral gain value and the second integral gain value. Further, the first integral of velocity error is input from the integrator 105 to the integral gain setting unit 106e, and the integral gain setting unit 106e inputs the product of the integral gain, which is set as described above, and the first integral of velocity error to the second positive input terminal of the adder 112c.

In the following explanation, the arithmetic coefficient means all of the position feedforward coefficient, the speed feedforward coefficient, the position control gain, the proportional gain and the integral gain, the first arithmetic coefficient value means all of the first position feedforward coefficient value, the first speed feedforward coefficient value, the first position control gain value, the first proportional gain value, and the first integral gain value, and the second arithmetic coefficient value means all of the second position feedforward coefficient value, the second speed feedforward coefficient value, the second position control gain value, the second proportional gain value and the second integral gain value.

The voltage command generation unit 9 converts a torque command into a current command, and generates a voltage command based on the current error between the value of the current command and the current value of the servo motor 5. The PWM signal generation unit 10 converts the voltage command into a PWM signal, and outputs the PWM signal to the inverter 4.

In the present embodiment, the speed detection unit 7, the servo motor control device 8, the voltage command generation unit 9 and the PWM signal generation unit 10 are implemented by a processor including an input/output port, a serial communication circuit, an A/D converter, a counter, etc., and execute processing, to be explained later, in accordance with processing programs stored in a memory, not shown schematically.

The upper control device 11 is configured by a CNC (computer numerical control), etc., and analyzes the machining program 12, and outputs a mode switch signal and a position command, which will be explained later, to the servo motor control device 8. To do this, the upper control device 11 has an operating command information creation unit 11a and a position command creation unit 11b.

The operating command information creation unit 11a reads in advance the operating command of the machining program after a predetermined period elapses from the present time if the current operation of the feed axis is the rapid-traverse operation, or analyzes the current operating command of the machining program if the current operation of the feed axis is the cutting-feed. Then, the operating command information creation unit 11a outputs a high or low arithmetic coefficient change signal to the arithmetic coefficient change unit 104 in accordance with the operating command, which is read in advance or is analyzed as described above. Consequently, the arithmetic coefficient change unit 104 continuously changes the arithmetic coefficient from the second arithmetic coefficient value to the first arithmetic coefficient value at the time of switching the arithmetic coefficient change signal from low to high, and continuously changes the arithmetic coefficient from the first arithmetic coefficient value to the second arithmetic coefficient value at the time of switching the arithmetic coefficient change signal from high to low. By inputting the high or low arithmetic coefficient change signal to the arithmetic coefficient change unit 104 as described above, the operating command information, which relates to the current operating command in the machining program 12 or the operating command after a predetermined period elapses from the present time, is provided to the arithmetic coefficient change unit 104.

Further, "the predetermined period" as described above is, for example, the shortest period of the periods during which the first arithmetic coefficient value is changed to the second arithmetic coefficient value, which are set so that a shock produced by the servo motor 5 is accepted by the machine tool.

The operating command information creation unit 11b analyzes the current position command from the machining program 12 and inputs the position command to the positive input terminal of the adder 111a.

Figure 3:
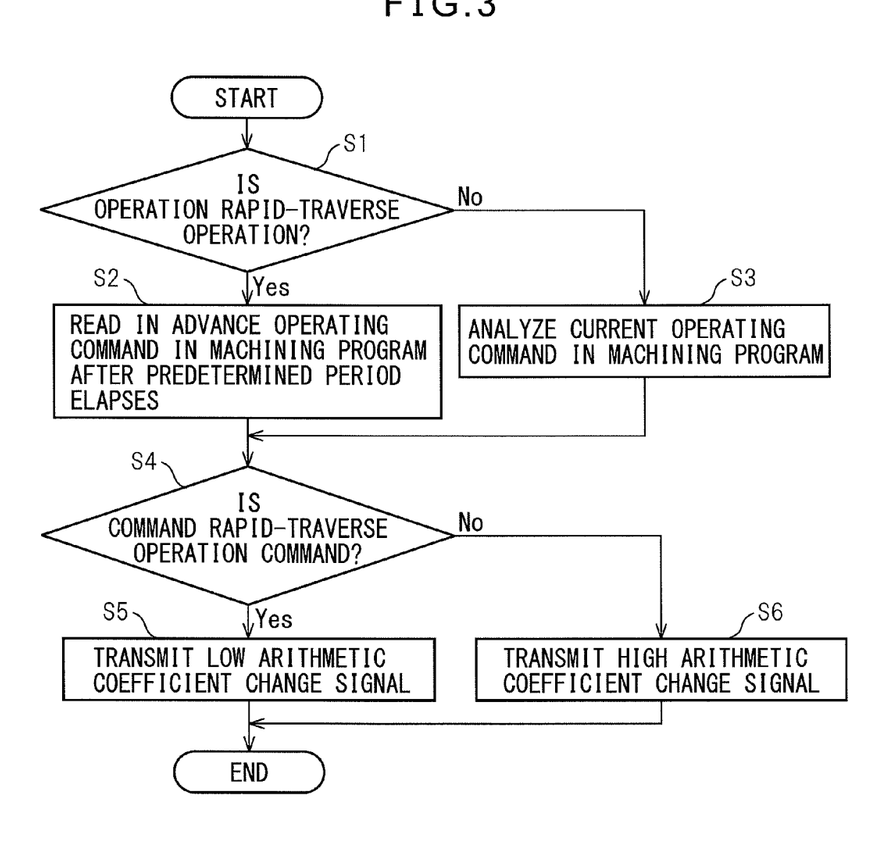
FIG. 3 is a flowchart of arithmetic coefficient change signal creation processing of an operating command information creation unit in FIG. 1.

FIG. 3 is a flowchart of arithmetic coefficient change signal creation processing of an operating command information creation unit in FIG. 1. This flowchart is carried out during the machining processing of a workpiece using a machine tool and controlled by processing programs in which the upper control device 11 executes.

First, the operating command information creation unit 11a determines whether or not the feed axis is in the rapid-traverse operation, based on the previous operating command in the machining program 12, which was previously analyzed, that is, based on the command to cause one of the rapid-traverse operation and the cutting-feed to be carried out (step S1).

If the operation of the feed axis is the rapid-traverse operation, the operating command information creation unit 11a reads in advance the operating command, which will be executed after a predetermined period elapses from the present time, in the machining program 12 in order to determine whether or not the operation of the feed axis switches from the rapid-traverse operation to the cutting-feed after the predetermined period elapses (step S2). In contrast to this, if the operation of the feed axis is not the rapid-traverse operation, that is, if the operation of the feed axis is the cutting-feed, the operating command information creation unit 11a analyzes the current operating command in the machining program 12 in order to determine whether or not the operation of the feed axis immediately switches from the cutting-feed to the rapid-traverse operation (step S3).

After step S2 or step S3, the operating command information creation unit 11a determines whether or not the operating command, which is read in advance or is analyzed, is the rapid-traverse operation command (step S4). If the operating command, which is read in advance or is analyzed, is the rapid-traverse operation command, the operating command information creation unit 11a transmits the low arithmetic coefficient change signal to the arithmetic coefficient change unit 104 (step S5), and then the upper control device 11 exits the processing flow. In contrast to this, if the operating command, which is read in advance or is analyzed, is not the rapid-traverse operation command, that is, if the operating command, which is read in advance or is analyzed, is the cutting-feed command, the operating command information creation unit 11a transmits the high arithmetic coefficient change signal to the arithmetic coefficient change unit 104 (step S6), and then the upper control device 11 exits the processing flow.

The current operating command is supplied from the upper control device 11 to the servo motor control device 8 by, for example, supplying a signal, to which a flag is added, from the upper control device 11 to the servo motor control device 8, and information, which relate to the current operating command is stored in a memory (not shown schematically), which is embedded in the servo motor control device 8. The servo motor control device 8 can determine the operating state of the feed axis by reading the information, which relates to the current operating command stored in the memory.

Figure 4:
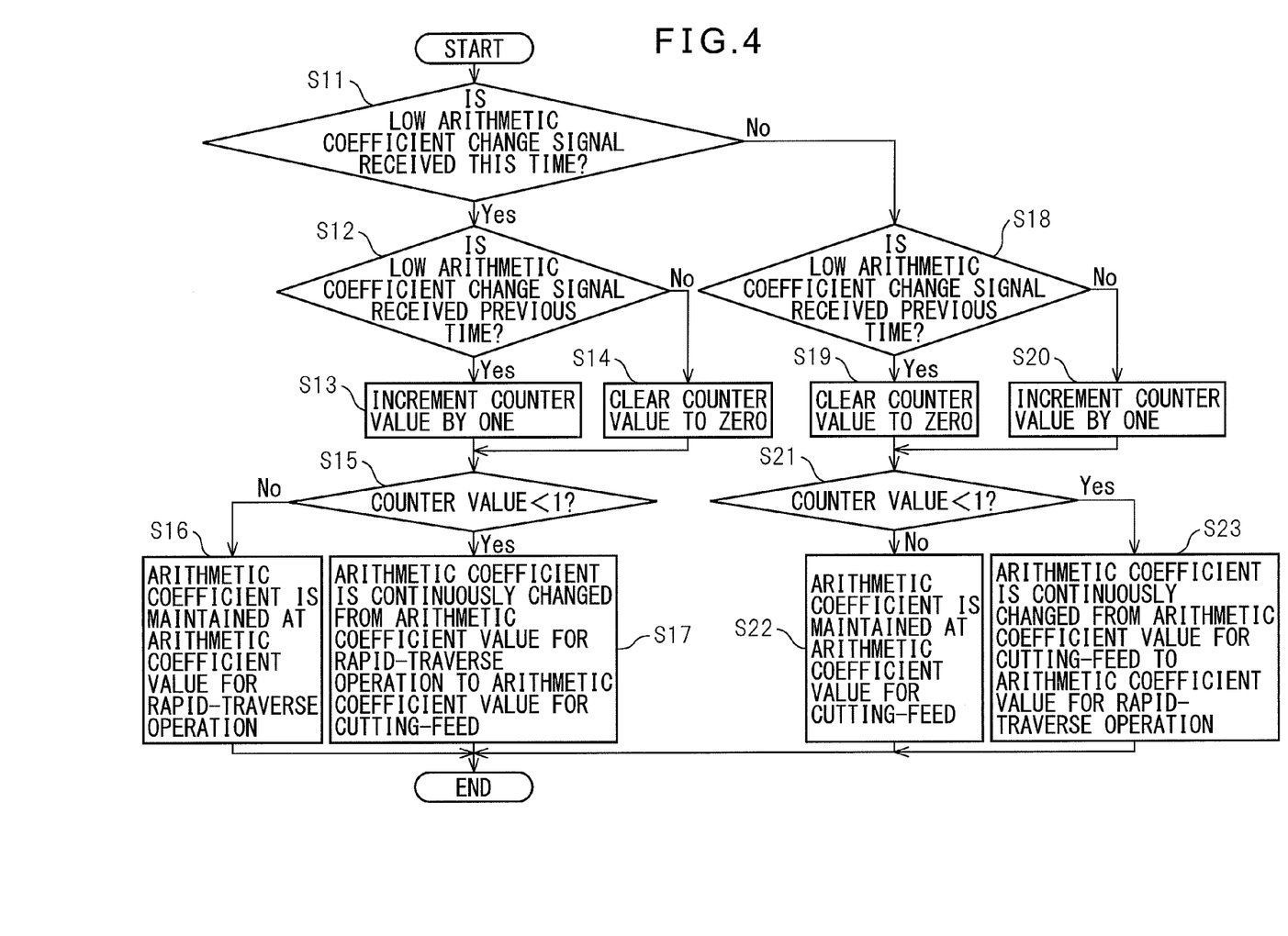
FIG. 4 is a flowchart of arithmetic coefficient change processing of an arithmetic coefficient change unit in FIG. 1.

FIG. 4 is a flowchart of arithmetic coefficient change processing of an arithmetic coefficient change unit in FIG. 1. This flowchart is carried out each time the arithmetic coefficient change unit 104 receives the arithmetic coefficient change signal during the machining processing of a workpiece machined by the machine tool and controlled by processing programs in which the servo motor control device 8 executes.

First, the arithmetic coefficient change unit 104 determines whether or not the arithmetic coefficient change signal, which is received this time, is low (step S11). If the arithmetic coefficient change signal, which is received this time, is low, the arithmetic coefficient change unit 104 determines whether or not the arithmetic coefficient change signal, which was received the previous time, is low (step S12). If the arithmetic coefficient change signal, which was received the previous time, is low, the arithmetic coefficient change unit 104 increments the counter value in the counter, which is embedded in the servo motor control device 8, by one (step S13). In contrast to this, if the arithmetic coefficient change signal received the previous time is not low, i.e., the arithmetic coefficient change signal, which was received the previous time, is high, the arithmetic coefficient change unit 104 clears the counter value in the counter to 0 (step S14).

After step S13 or step S14, the arithmetic coefficient change unit 104 determines whether or not the counter value in the counter, which is embedded in the servo motor control device 8, is less than 1 (step S15). If the counter value is not less than 1, the arithmetic coefficient change unit 104 determines that the feed axis continues to carry out the rapid-traverse operation and maintains the arithmetic coefficient at the second arithmetic coefficient value (step S16), and then the servo motor control device 8 exits the processing flow. In contrast to this, if the counter value is less than 1, the arithmetic coefficient change unit 104 predicts that the operation of the feed axis will switch from the rapid-traverse operation to the cutting-feed after a predetermined period elapses and continuously changes the arithmetic coefficient from the second arithmetic coefficient value to the first arithmetic coefficient value (step S17), and then the servo motor control device 8 exits the processing flow.

On the other hand, if it is determined in step S11 that the arithmetic coefficient change signal, which is received this time, is low, the arithmetic coefficient change unit 104 determines whether or not the arithmetic coefficient change signal, which was received the previous time, is low (step S18). If the arithmetic coefficient change signal, which was received the previous time, is low, the arithmetic coefficient change unit 104 clears the counter value in the counter, which is embedded in the servo motor control device 8, to 0 (step S19). In contrast to this, if the arithmetic coefficient change signal, which was received the previous time, is not low, i.e., if the arithmetic coefficient change signal, which was received the previous time, is high, the arithmetic coefficient change unit 104 increments the counter value in the counter by one (step S20).

After incrementing the counter value by one or clearing the counter value to 0, the arithmetic coefficient change unit 104 determines whether or not the counter value in the counter, which is embedded in the servo motor control device 8, is less than 1 (step S21). If the counter value is not less than 1, the arithmetic coefficient change unit 104 determines that the feed axis continues to carry out the cutting-feed and maintains the arithmetic coefficient at the second arithmetic coefficient value (step S22), and then the servo motor control device 8 exits the processing flow. In contrast to this, if the counter value is less than 1, the arithmetic coefficient change unit 104 predicts that the operation of the feed axis will immediately switch from the cutting-feed to the rapid-traverse operation and continuously changes the arithmetic coefficient from the first arithmetic coefficient value to the second arithmetic coefficient value (step S23), and then the servo motor control device 8 exits the processing flow.

Figure 5:
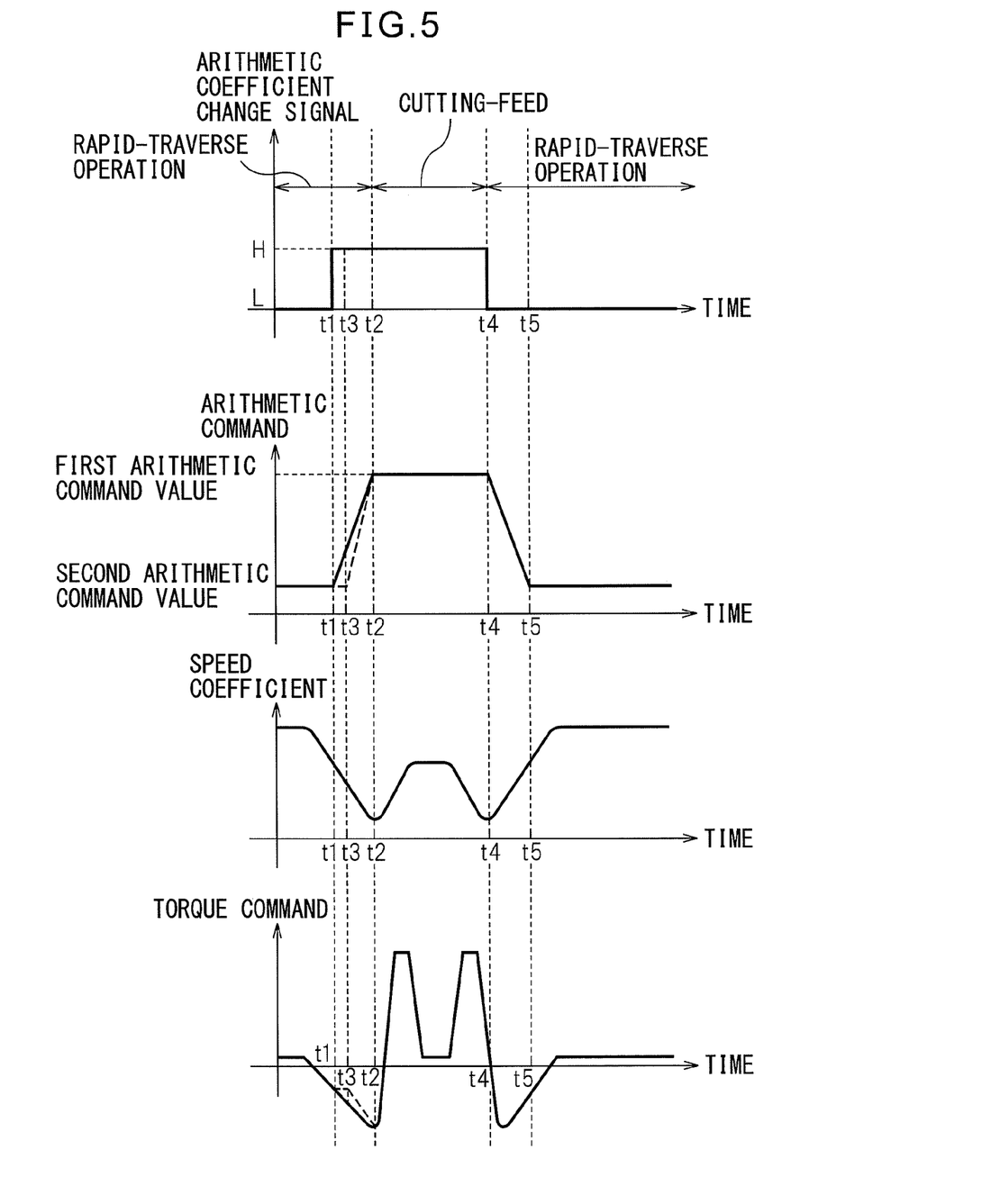
FIG. 5 is graphs for explaining an operation of the servo motor drive control device in FIG. 1.

FIG. 5 is graphs for explaining an operation of the servo motor drive control device in FIG. 1. FIG. 5 shows a graph showing a change with time of the arithmetic coefficient change signal, a graph showing a change with time of the arithmetic coefficient, a graph showing a change with time of the velocity command, and a graph showing a change with time of the torque command beginning at the top.

In FIG. 5, the arithmetic coefficient change unit 104 predicts at time t1 as a first time, which is an arbitrary time during the rapid-traverse operation, that the operating command in the machining program 12 will switch from the rapid-traverse operation command to the cutting-feed command at time t2 as a second time after the time t1, based on the operating command at the time t2, which is read in advance by the upper control device 11. After that, the arithmetic coefficient change unit 104 continuously changes the arithmetic coefficient from the second arithmetic coefficient value to the first arithmetic coefficient value over a period between the time t1 and the time t2 (first period). It may also be possible to continuously change the arithmetic coefficient from the second arithmetic coefficient value to the first arithmetic coefficient value over a period between time t3 as a third time after the time t1 and before the time t2, and the time t2 (second period). Further, in FIG. 5, the continuous change from the second arithmetic coefficient value to the first arithmetic coefficient value is carried out linearly, i.e., carried out by linear interpolation with a time constant of the first period or the second period, however, the continuous change does not need to be linear and the continuous change may be, for example, an exponential change.

As described above, by continuously changing arithmetic coefficient from the second arithmetic coefficient value to the first arithmetic coefficient value over the first period or the second period, the arithmetic coefficient is set to the first arithmetic coefficient value for the cutting-feed at the time t2 when the cutting-feed starts, and therefore, the machining accuracy does not deteriorate immediately after the operation of the feed axis of the machine tool switches from the rapid-traverse operation to the cutting-feed. Further, by continuously changing the arithmetic coefficient from the second arithmetic coefficient value to the first arithmetic coefficient value over the first period or the second period, the torque command does not become discontinuous even if the velocity command of the servo motor 5 is not set to zero, and therefore, no shock of the servo motor 5 occurs. Consequently, it is no longer necessary to stop the servo motor 5 during machining of a workpiece using the machine tool, and therefore, it is possible to shorten the machining time of the workpiece using the machine tool.

The arithmetic coefficient change unit 104 predicts that the operating command will switch from the cutting-feed command to the rapid-traverse operation command at time t4 as a fourth time. After that, the arithmetic coefficient change unit 104 continuously changes the arithmetic coefficient from the first arithmetic coefficient value to the second arithmetic coefficient value over a period between the time t4 and time t5 as a fifth time, which is an arbitrary time during the rapid-traverse operation in accordance with the rapid-traverse operation command after the time t4 (third period). Due to this, when the feed operation of the feed axis switches from the cutting-feed to the rapid-traverse operation, the change of the arithmetic coefficient from the first arithmetic coefficient value to the second arithmetic coefficient value starts immediately, and therefore, the arithmetic coefficient is always set to the first arithmetic coefficient value during the cutting-feed of the feed axis.

Consequently, according to the present embodiment, the machining time of a workpiece to be machined by the machine tool is shortened and the machining accuracy does not deteriorate immediately after the feed axis of the machine tool switches from the rapid-traverse operation to the cutting-feed.

Figure 6:
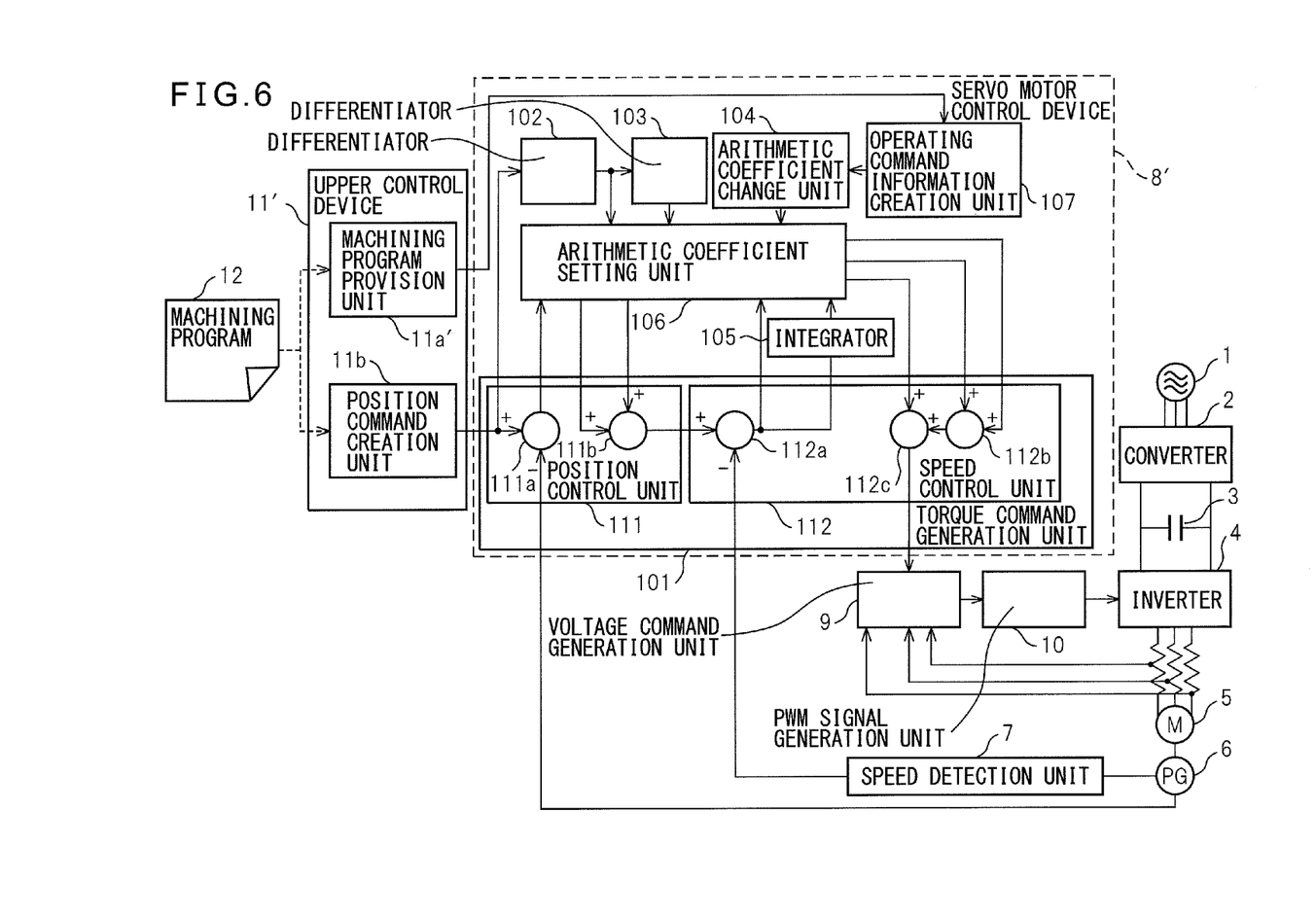
FIG. 6 is a block diagram of a system having a servo motor drive control device according to a second embodiment of the present invention.

FIG. 6 is a block diagram of a system having a servo motor drive control device according to a second embodiment of the present invention. The system shown in FIG. 6 has the three-phase alternating-current power source 1, the converter 2, the smoothing capacitor 3, the inverter 4, the servo motor 5, the position detection unit 6, the speed detection unit 7, a servo motor control device 8', the voltage command generation unit 9, the PWM signal generation unit 10, and an upper control device 11' as an external control device.

In FIG. 6, the three-phase alternating-current power source 1, the converter 2, the smoothing capacitor 3, the inverter 4, the servo motor 5, the position detection unit 6, the speed detection unit 7, the voltage command generation unit 9 and the PWM signal generation unit 10 have the same configurations as those of the three-phase alternating-current power source 1, the converter 2, the smoothing capacitor 3, the inverter 4, the servo motor 5, the position detection unit 6, the speed detection unit 7, the voltage command generation unit 9 and the PWM signal generation unit 10 of the first embodiment shown in FIG. 1, and therefore, explanation thereof is omitted.

In the embodiment shown in FIG. 6, the servo motor control device 8' further has an operating command information creation unit 107, which has the same function as that of the operating command information creation unit 11a in FIG. 1. The upper control device 11' has a machining program provision unit 11a' configured to acquire the machining program 12 and to provide it to the operating command information creation unit 107, in place of the operating command information creation unit 11a of the first embodiment shown in FIG. 1.

Figure 7:
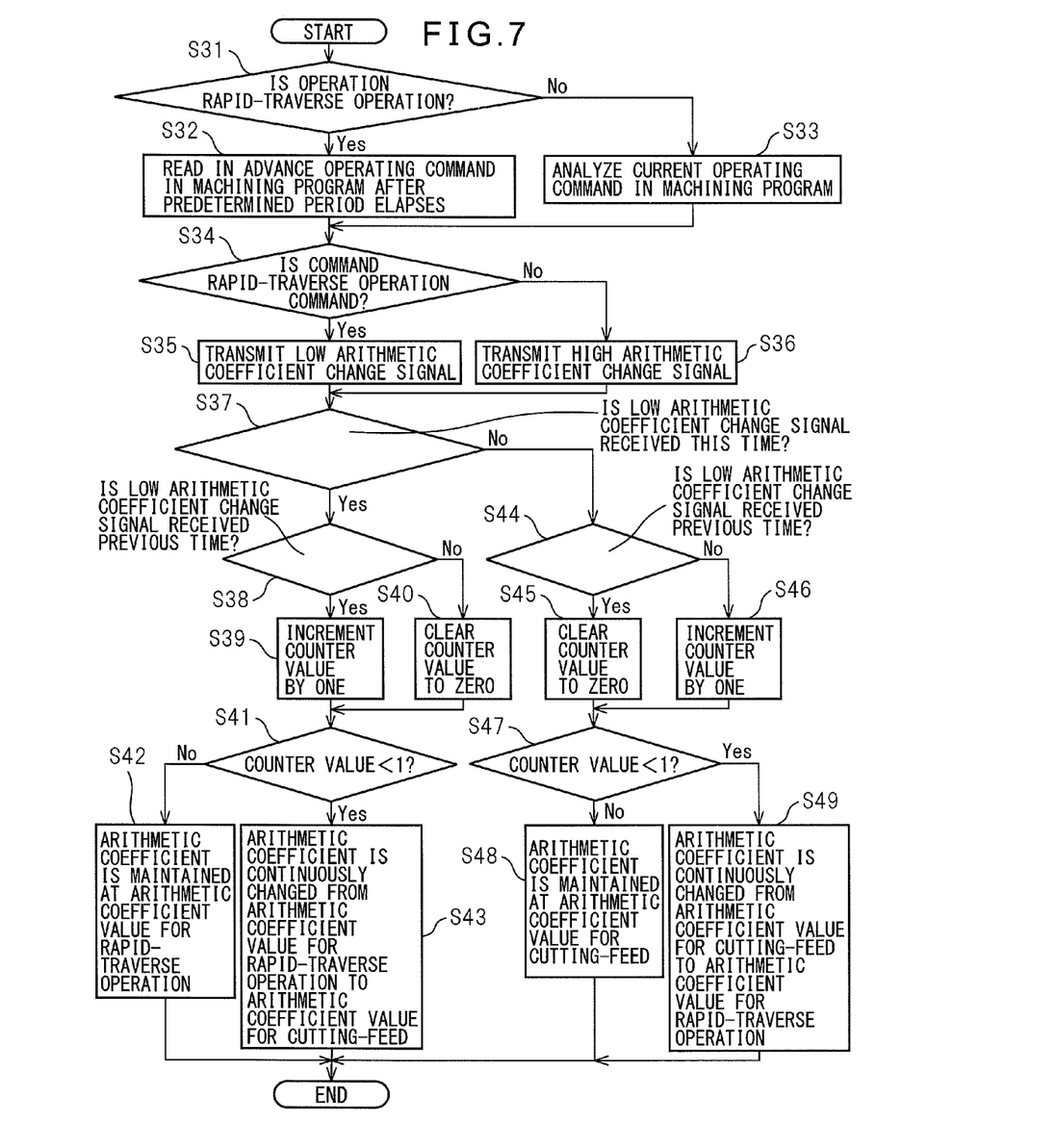
FIG. 7 is a flowchart of arithmetic coefficient change signal creation processing and arithmetic coefficient change processing of an arithmetic coefficient change unit and an operating command information creation unit in FIG. 6.

FIG. 7 is a flowchart of arithmetic coefficient change signal creation processing and arithmetic coefficient change processing of the arithmetic coefficient change unit and the operating command information creation unit in FIG. 6. This flowchart is carried out during the machining processing of a workpiece using the machine tool and controlled by processing programs in which the servo motor control device 8' executes.

First, the operating command information creation unit 107 determines whether or not the feed axis is in the rapid-traverse operation, based on the previous operating command of the machining program 12 which was previously analyzed, i.e., the command to cause any one of the rapid-traverse operation and the cutting-feed to be carried out (step S31).

If the feed axis carries out the rapid-traverse operation, the operating command information creation unit 107 reads in advance the operating command, which will be executed after a predetermined period elapses from the present time, in the machining program 12, in order to determine whether or not the operation of the feed axis switches from the rapid-traverse operation to the cutting-feed after a predetermined period elapses (step S32). In contrast to this, if the feed axis does not carry out the rapid-traverse operation, i.e., if the feed axis carries out the cutting-feed, the operating command information creation unit 107 analyzes the current operating command in the machining program 12 in order to determine whether or not the operation of the feed axis immediately switches from the cutting-feed to the rapid-traverse operation (step S33).

After step S32 or step S33, the operating command information creation unit 107 determines whether or not the operating command, which is read in advance or is analyzed, is the rapid-traverse operation command (step S34). If the operating command, which is read in advance or is analyzed, is the rapid-traverse operation, the operating command information creation unit 107 transmits a low arithmetic coefficient change signal to the arithmetic coefficient change unit 104 (step S35). In contrast to this, if the operating command, which is read in advance or is analyzed, is not the rapid-traverse operation command, i.e., if the operating command, which is read in advance or is analyzed, is the cutting-feed command, the operating command information creation unit 107 transmits a high arithmetic coefficient change signal to the arithmetic coefficient change unit 104 (step S36).

After step S35 or step S36, the arithmetic coefficient change unit 104 determines whether or not the arithmetic coefficient change signal, which is received this time, is low (step S37). If the arithmetic coefficient change signal, which is received this time, is low, the arithmetic coefficient change unit 104 determines whether or not the arithmetic coefficient change signal, which was received the previous time, is low (step S38). If the arithmetic coefficient change signal, which was received the previous time, is low, the arithmetic coefficient change unit 104 increments the counter value in the counter, which is embedded in the servo motor control device 8', by one (step S39). In contrast to this, if the arithmetic coefficient change signal, which was received the previous time, is not low, i.e., if the arithmetic coefficient change signal, which was received the previous time, is high, the arithmetic coefficient change unit 104 clears the counter value in the counter to 0 (step S40).

After step S39 or step S40, the arithmetic coefficient change unit 104 determines whether or not the counter value in the counter, which is embedded in the servo motor control device 8', is less than 1 (step S41). If the counter value is not less than 1, the arithmetic coefficient change unit 104 determines that the feed axis continues to carry out the rapid-traverse operation and maintains the arithmetic coefficient at the second arithmetic coefficient value, and then the servo motor control device 8 exits the processing flow (step S42). In contrast to this, if the counter value is less than 1, the arithmetic coefficient change unit 104 predicts that the operation of the feed axis switches from the rapid-traverse operation to the cutting-feed after a predetermined period elapses and continuously changes the arithmetic coefficient from the second arithmetic coefficient value to the first arithmetic coefficient value (step S43), and then the servo motor control device 8' exits the processing flow.

On the other hand, if it is determined in step S37 that the arithmetic coefficient change signal, which is received this time, is low, the arithmetic coefficient change unit 104 determines whether or not the arithmetic coefficient change signal, which was received the previous time, is low (step S44). If the arithmetic coefficient change signal, which was received the previous time, is low, the arithmetic coefficient change unit 104 clears the counter value in the counter, which is embedded in the servo motor control device 8', to 0 (step S45). In contrast to this, if the arithmetic coefficient change signal, which was received the previous time, is not low, i.e., if the arithmetic coefficient change signal, which was received the previous time, is high, the arithmetic coefficient change unit 104 increments the counter value in the counter by one (step S46).

After step S45 or step S46, the arithmetic coefficient change unit 104 determines whether or not the counter value in the counter, which is embedded in the servo motor control device 8', is less than 1 (step S47). If the counter value is not less than 1, the arithmetic coefficient change unit 104 determines that the feed axis continues to carry out the cutting-feed and maintains the arithmetic coefficient at the second arithmetic coefficient value (step S48), and then the servo motor control device 8' exits the processing flow. In contrast to this, if the counter value is less than 1, the arithmetic coefficient change unit 104 predicts that the operation of the feed axis switches immediately from the cutting-feed to the rapid-traverse operation and continuously changes the arithmetic coefficient from the first arithmetic coefficient value to the second arithmetic coefficient value (step S49), and then the servo motor control device 8' exits the processing flow.

According to the present embodiment, it is possible to read in advance the operating command in the machining program 12 after a predetermined period elapses in the servo motor control device 8'.

Figure 8:
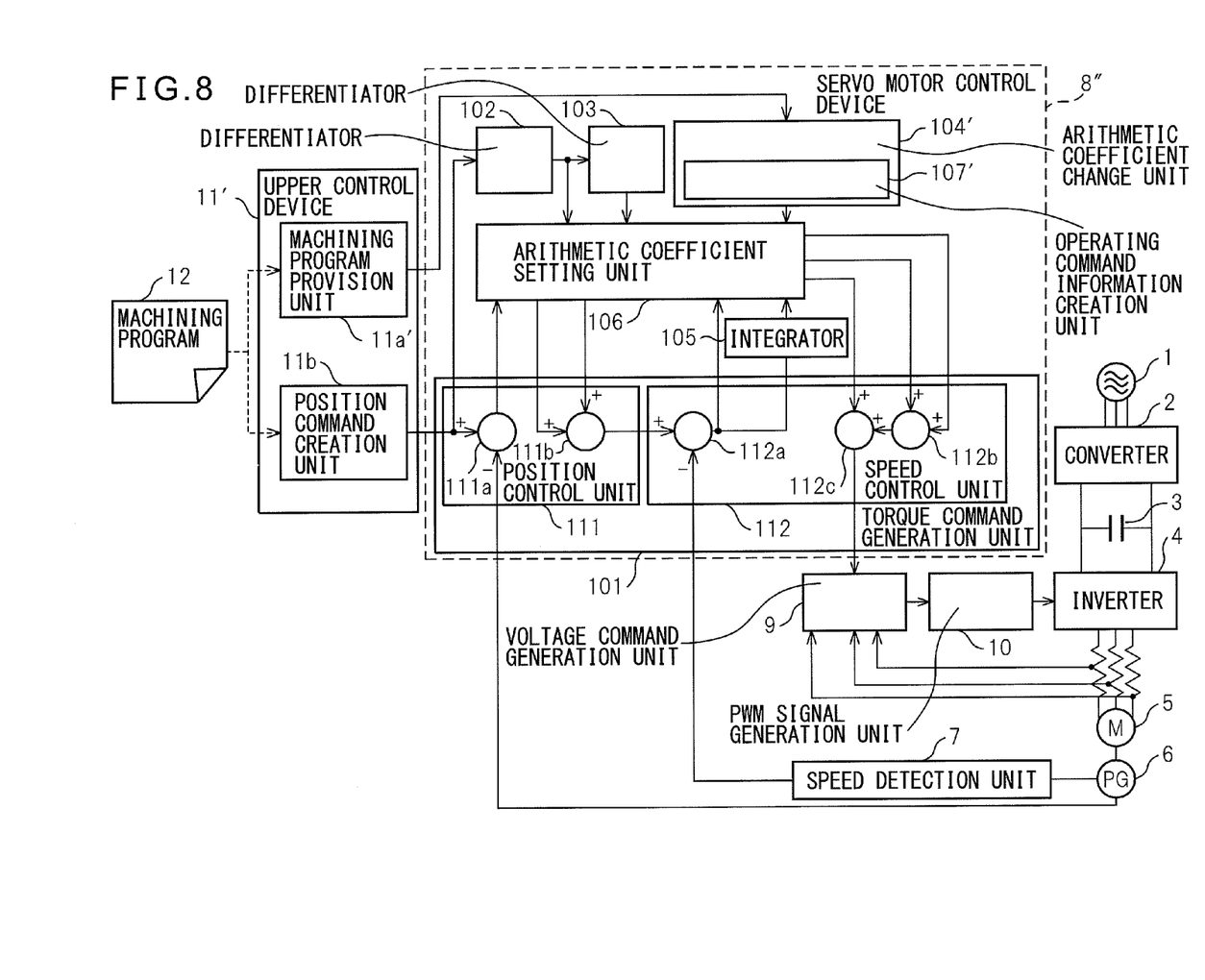
FIG. 8 is a block diagram of a system having a servo motor drive control device according to a third embodiment of the present invention.

FIG. 8 is a block diagram of a system having a servo motor drive control device according to a third embodiment of the present invention. The system shown in FIG. 8 has the three-phase alternating-current power source 1, the converter 2, the smoothing capacitor 3, the inverter 4, the servo motor 5, the position detection unit 6, the speed detection unit 7, a servo motor control device 8", the voltage command generation unit 9, the PWM signal generation unit 10, and the upper control device 11' as an external control device.

In FIG. 8, the three-phase alternating-current power source 1, the converter 2, the smoothing capacitor 3, the inverter 4, the servo motor 5, the position detection unit 6, the speed detection unit 7, the voltage command generation unit 9, the PWM signal generation unit 10 and the upper control device 11' have the same configurations as those of the three-phase alternating-current power source 1, the converter 2, the smoothing capacitor 3, the inverter 4, the servo motor 5, the position detection unit 6, the speed detection unit 7, the voltage command generation unit 9, the PWM signal generation unit 10 and the upper control device 11' of the second embodiment shown in FIG. 6, and therefore, explanation thereof is omitted.

In the embodiment shown in FIG. 8, the servo motor control device 8'' has an arithmetic coefficient change unit 104' having an operating command information creation unit 107', in place of the arithmetic coefficient change unit 104 and the operating command information creation unit 107, and the operating command information creation unit 107' has the same function as that of the operating command information creation unit 107 in FIG. 6.

According to the present embodiment, it is no longer necessary to transmit or receive arithmetic coefficient change signal in order to predict the operation of the machining program 12 which will be carried out after a predetermined period elapses.

The present invention is not limited to the above-mentioned embodiments and there can be a number of alterations and modifications. For example, as a commercial alternating-current power source, the three-phase alternating-current power source 3 is used, however, it is also possible to use a multi-phase alternating-current power source other than the three-phase alternating-current power source as a commercial alternating-current power source.

Further, the case where both the feedforward arithmetic coefficient and the feedback arithmetic coefficient are set to a value between the first arithmetic coefficient value and the second arithmetic coefficient value, is explained, however, it is also possible to apply the present invention to a case where any one of the feedforward arithmetic coefficient and the feedback arithmetic coefficient is set to a value between the first arithmetic coefficient value and the second arithmetic coefficient value.

Further, the case where the position feedforward coefficient, the speed feedforward coefficient, the position control gain, the proportional gain and the integral gain are used as the arithmetic coefficient, is explained, however, it is also possible to apply the present invention to a case where at least one of the position feedforward coefficient, the speed feedforward coefficient, the position control gain, the proportional gain and the integral gain is used as the arithmetic coefficient, a case where an arithmetic coefficient other than the position feedforward coefficient, the speed feedforward coefficient, the position control gain, the proportional gain, and the integral gain is used as the arithmetic coefficient, etc.

Further, the case where both the position command and the velocity command are used to generate a torque command, is explained, however, it is also possible to apply the present invention to a case where any one of the position command and the velocity command is used to generate a torque command.

Further, the case where both position information and speed information are provided to generate a torque command, is explained, however, it is also possible to apply the present invention to a case where any one of position information and speed information is used to generate a torque command.

Furthermore, the case where both feedforward control and feedback control are carried out, is explained, however, it is also possible to apply the present invention to a case where only feedback control is carried out.

As above, the present invention is explained in relation to the preferred embodiments, however, a person skilled in the art will understand that various alterations and modifications can be made without deviating from the scope of disclosure of claims.

The invention claimed is:

1. A servo motor control device for carrying out feedback control to a servo motor configured to drive a feed axis of a machine tool in order to carry out: a cutting-feed to move the feed axis of the machine tool while cutting a workpiece if an operating command in a machining program to machine the workpiece using the machine tool is a cutting-feed command; and a rapid-traverse operation to move the feed axis of the machine tool without cutting a workpiece if the operating command in the machining program to machine the workpiece using the machine tool is a rapid-traverse operation command, comprising:

an arithmetic coefficient setting unit configured to set a feedback control arithmetic coefficient to a value between a first feedback control arithmetic coefficient value for the cutting-feed and a second feedback control arithmetic coefficient value for the rapid-traverse operation smaller than the first feedback control arithmetic coefficient value;

an arithmetic coefficient change unit configured to continuously change the feedback control arithmetic coefficient from the second feedback control arithmetic coefficient value to the first feedback control arithmetic coefficient value over a first period between a first time, which is an arbitrary time during the rapid-traverse operation, and a second time after the first time or a second period between a third time after the first time and before the second time, and the second time if it is predicted at the first time that the operating command will switch from the rapid-traverse operation command to the cutting-feed command at the second time; and a torque command generation unit configured to generate a torque command to the servo motor based on at least one of a position command to the servo motor and a velocity command to the servo motor, at least one of a position error of the servo motor and a velocity error of the servo motor, and the feedback control arithmetic coefficient.

2. The servo motor control device according to claim 1, wherein the arithmetic coefficient change unit predicts whether or not the operating command will switch from the rapid-traverse operation command to the cutting-feed command at the second time, based on operating command information, which relates to the operating command at the second time, supplied from an external control device, which has read in advance the operating command at the second time from the machining program.

3. The servo motor control device according to claim 1, further having an operating command information creation unit configured to create operating command information, which relates to the operating command at the second time by reading in advance the operating command at the second time from the machining program and provide the operating command information to the arithmetic coefficient change unit, wherein the arithmetic coefficient change unit predicts whether or not the operating command will switch from the rapid-traverse operation to the cutting-feed at the second time, based on the operating command information.

4. The servo motor control device according to claim 1, wherein the arithmetic coefficient change unit further has an operating command information creation unit configured to create operating command information, which relates to the operating command at the second time by reading in advance the operating command at the second time from the machining program, and predicts whether or not the operating command will switch from the rapid-traverse operation to the cutting-feed at the second time, based on the operating command information.

5. The servo motor control device according to claim 1, wherein
the arithmetic coefficient change unit linearly changes the feedback control arithmetic coefficient from the second feedback control arithmetic coefficient value to the first feedback control arithmetic coefficient value.

6. The servo motor control device according to claim 1, wherein
if it is predicted that the operating command will switch from the cutting-feed command to the rapid-traverse operation command, the arithmetic coefficient change unit continuously changes the feedback control arithmetic coefficient from the first feedback control arithmetic coefficient value to the second feedback control arithmetic coefficient value over third period between a fourth time when the operating command switches from the cutting-feed command to the rapid-traverse operation command and a fifth time, which is an arbitrary time during the rapid-traverse operation in accordance with the rapid-traverse operation command after the fourth time.

7. The servo motor control device according to claim 6, wherein
the arithmetic coefficient change unit linearly changes the feedback control arithmetic coefficient from the first feedback control arithmetic coefficient value to the second feedback control arithmetic coefficient value.

8. A servo motor control device for carrying out feedforward control and feedback control for a servo motor configured to drive a feed axis of a machine tool in order to carry out: a cutting-feed to move the feed axis of the machine tool while cutting a workpiece if an operating command in a machining program to machine the workpiece using the machine tool is a cutting-feed command; and a rapid-traverse operation to move the feed axis of the machine tool without cutting a workpiece if the operating command of the machining program in a machining program to machine the workpiece using the machine tool is a rapid-traverse operation command, comprising:

an arithmetic coefficient setting unit configured to set a feedforward control arithmetic coefficient to a value between a first feedforward control arithmetic coefficient value for the cutting-feed and a second feedforward control arithmetic coefficient value for the rapid-traverse operation smaller than the first feedforward control arithmetic coefficient value;

an arithmetic coefficient change unit configured to continuously change the feedforward control arithmetic coefficient from the second feedforward control arithmetic coefficient value to the first feedforward control arithmetic coefficient value over a first period between a first time, which is an arbitrary time during the rapid-traverse operation, and a second time after the first time or a second period between a third time after the first time and before the second time, and the second time if it is predicted at the first time that the operating command will switch from the rapid-traverse operation command to the cutting-feed command at the second time; and a torque generation unit configured to generate a torque command to the servo motor based on at least one of a position command to the servo motor and a velocity command to the servo motor and the feedforward control arithmetic coefficient.

* * * * *